No. 769,938. Patented September 13, 1904.

UNITED STATES PATENT OFFICE.

HENRY R. CASSEL, OF NEW YORK, N. Y.

PROCESS OF EXTRACTING PRECIOUS METALS FROM ORES OR SLIMES.

SPECIFICATION forming part of Letters Patent No. 769,938, dated September 13, 1904.

Application filed January 16, 1904. Serial No. 189,289. (No specimens.)

*To all whom it may concern:*

Be it known that I, HENRY R. CASSEL, a citizen of the United States, residing at New York city, (Manhattan,) county and State of New York, have invented new and useful Improvements in Processes of Extracting Precious Metals from Ores or Slimes, of which the following is a specification.

This invention relates to an improved process for treating refractory ores and slimes containing gold or other precious metals to extract the values.

The process is applicable to the treatment of higher or lower grades of ores.

When refractory ores, such as tellurides, are treated with a solution of a cyanid, the extraction is imperfect. When, however, a bromid of potassium or other suitable base is added to the cyanid solution and chlorin gas is slowly and gradually introduced, the gold or other precious metal will be readily dissolved.

In practice the ore is pulverized and converted into a pulp by admixture of one ton of ore with an equal weight of water containing about five pounds of a bromid of potassium or other suitable base and three pounds of cyanid of potassium or other suitable base. The pulp is conveyed into ordinary agitating-tanks and thoroughly stirred. The above solution containing cyanid and bromid will dissolve only part of the gold. When, however, about three pounds of chlorin gas are slowly and gradually introduced into the mixture, a thorough extraction is effected in about ten to fifteen hours, the gold being found in solution as a cyanid. The chlorin gradually unites with the bases of the bromid, setting free bromin which, together with the cyanid, forms a solvent for rapidly dissolving the gold according to the following reactions:

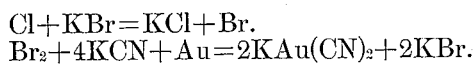

$$Cl + KBr = KCl + Br.$$
$$Br_2 + 4KCN + Au = 2KAu(CN)_2 + 2KBr.$$

As shown by the above equations, the bromin is reconverted into bromid, which may be used upon a fresh batch of ore. The chlorin should be added gradually and in a quantity sufficient to liberate only a small portion of the bromin at a time, so as to prevent an undue consumption of the cyanid. When the extraction is complete, the pulp is conveyed into filter-presses or similar devices to separate the solution containing the dissolved metals from the pulp. This solution now contains the gold and practically all the bromid originally added and also the cyanid which has not been consumed during the operation. The gold in solution is precipitated on zinc in the usual manner, and the solution from the zinc boxes containing bromid is again used after being brought up to the required strength by adding cyanid.

The process may also be applied to extract the values from a quiescent body of ore by percolation.

What I claim is—

1. The process of extracting precious metals from ores, which consists in adding a bromid and a cyanid in solution to the ore, and then passing chlorin gas through the mixture, substantially as specified.

2. The process of extracting precious metals from ores, which consists in adding a bromid and a cyanid in solution to the ore, and then passing chlorin gas through the mixture to convert the bromid into bromin and form solvents for the precious metals, substantially as specified.

3. The process of extracting precious metals from ores, which consists in adding a bromid and a cyanid in solution to the ore, then passing chlorin gas through the mixture to convert the bromid into bromin and form solvents for the precious metals, and reconverting the bromin into bromid, substantially as specified.

Signed by me at New York city, (Manhattan,) New York, this 7th day of January, 1904.

HENRY R. CASSEL.

Witnesses:
   WILLIAM SCHULZ,
   FRANK V. BRIESEN.